United States Patent [19]

Roseano

[11] Patent Number: 4,712,666

[45] Date of Patent: Dec. 15, 1987

[54] DEVICE TO COUNT BARS

[75] Inventor: Giancarlo Roseano, Buttrio, Italy

[73] Assignee: Danieli & C. Officine Meccaniche SpA, Buttrio, Italy

[21] Appl. No.: 869,817

[22] Filed: May 30, 1986

Related U.S. Application Data

[63] Continuation of Ser. No. 610,581, May 15, 1984, abandoned.

[30] Foreign Application Priority Data

Jul. 27, 1983 [IT] Italy .............................. 83429 A/83

[51] Int. Cl.[4] ......................... B65G 47/12; G06M 7/00

[52] U.S. Cl. .................................... 198/503; 198/453; 414/745

[58] Field of Search ........... 198/424, 443, 453, 468.01, 198/468.7, 468.1, 469.1, 478.1, 484.1, 503, 540, 542, 550.01, 550.4, 550.5, 560, 561, 568, 803.13–803.16; 414/745, 748; 221/202, 205

[56] References Cited

U.S. PATENT DOCUMENTS

| | | | |
|---|---|---|---|
| 1,252,562 | 1/1918 | Fassinger | 198/453 X |
| 2,977,023 | 3/1961 | Meyer | 221/205 |
| 3,315,784 | 4/1967 | Poll | 198/453 |
| 3,400,858 | 9/1968 | Strohmeier et al. | 221/202 |
| 3,743,135 | 7/1973 | Brumley | 221/205 |
| 4,298,118 | 11/1981 | Cottrell | 198/503 X |
| 4,388,039 | 6/1983 | Schwarze | 221/202 X |

FOREIGN PATENT DOCUMENTS

| | | | |
|---|---|---|---|
| 1474775 | 4/1969 | Fed. Rep. of Germany | 221/205 |
| 2937496 | 3/1980 | Fed. Rep. of Germany | 198/443 |
| 1551678 | 12/1968 | France | 198/443 |
| 0156924 | 9/1982 | Japan | 198/443 |
| 0895843 | 1/1982 | U.S.S.R. | 198/443 |

*Primary Examiner*—Robert J. Spar
*Assistant Examiner*—Lyle Kimms
*Attorney, Agent, or Firm*—Wegner & Bretschneider

[57] ABSTRACT

This invention concerns a device (10) to count bars which is suitable for performing the counting with counter (16) to count bars (11) arranged even in heaps on a conveyor (12). The device (10) includes in cooperation a guide funnel (14) which ables to arrange at least one end of such bars (11) in an ordered manner, and withdrawal device (15) which withdraws at least such ordered ends of such bars (11) one by one from the guide funnel (14).

17 Claims, 7 Drawing Figures

DEVICE TO COUNT BARS

Figure 1:
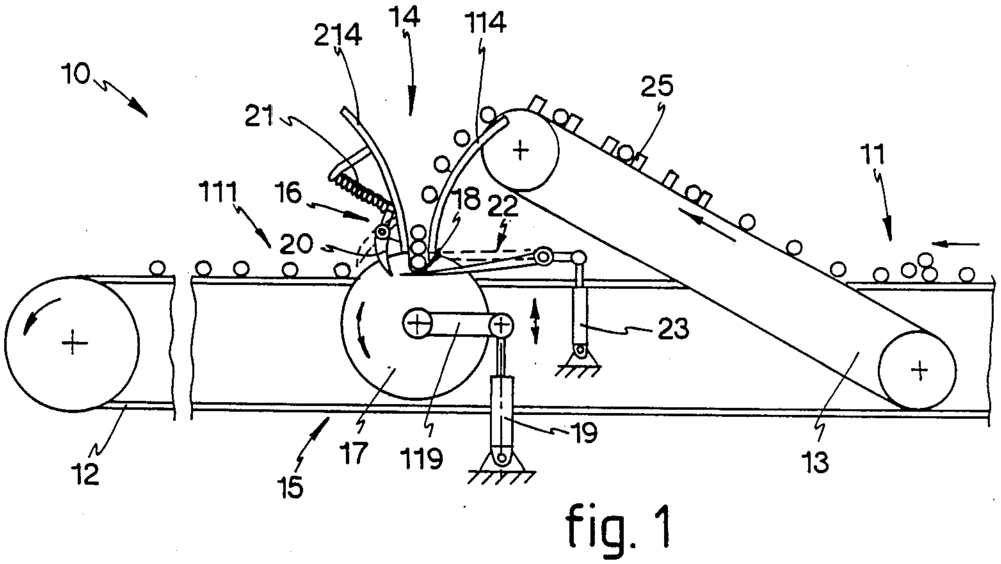

This application is a continuation of U.S. application Ser. No. 610,581, filed May 15, 1984, now abandoned.

This invention concerns a device to count bars. To be more exact, the invention concerns a device to count bars which is able to perform the counting of bars carried along a conveyor which can be of a belt type or chain type or of another like or equivalent type.

The device of the invention can count such bars even in a case where the bars themselves are variously piled up or entangled along the conveyor.

Such is the case, for instance, of round steel bars for reinforced concrete which are carried on a chain conveyor and come from a line where they have been cut to size.

However, the device shall not be understood as being restricted to such an application, since it is suitable for counting elongated articles of any type, not necessarily metallic articles, such as bars or tubes having a wide variety of sections and consisting of differing materials.

Hereinafter the word "bar" shall be understood as covering a plurality of such articles.

Various devices are known which are intended to count bars; some of such devices make use of mechanical means such as catches or abutments, which are displaced or contacted by the bars while the latter are moving, and thus actuate counter devices. Other systems, among which are embodiments in the name of the present assignee, employ optical means, such as photoelectric cells, or magnetic means. However, the known methods and devices require at least an orderly, if not equally spaced, arrangement of the bars to be counted along the moving conveyor. The known devices are not able to perform the counting or any separation of bars arranged variously and heaped or entangled on the conveyor itself.

It is a purpose of this invention to provide a device able to count bars however they may be arranged along a conveyor, whether spaced apart or positioned in intimate contact with each other or lying pell-mell and possibly heaped together or entangled, without such arrangement entailing any hindrance, according to the invention, to the counting of such bars by the device disclosed in this text.

The invention also has the purpose of separating at least one end of such bars and of counting them when they have been thus separated. Another purpose of the invention is to enable the device to be halted when a pre-set number of bars has been reached, and also to enable the group of bars thus counted to be discharged.

To this end the invention envisages the cooperation of suitable withdrawal means with the present counter device.

The above purposes of the invention and still other purposes which will become clear in the following description are attained by providing specific means able to arrange the ends of the bars in an orderly manner one after the other, and also be providing means to engage the bars one by one and to send them to sensor counter means.

Such operations concern only one end of the bars, and it is not important how much the portions of the bars distant from that end may be heaped up on each other. In fact, the portions of the bars distant from such end employed for the counting may be heaped up or entangled with each other without this hindering the proper working of the device, as many tests conducted by the present assignee have shown.

This invention is therefore embodied with a device to count bars which is suitable for performing the counting with means to count bars arranged even in heaps on a conveyor, the device being characterized by including in cooperation:

a guide funnel able to arrange at least one end of such bars in an ordered manner, and withdrawal means which withdraw at least such ends of such bars one by one from the guide funnel.

Figure 2:
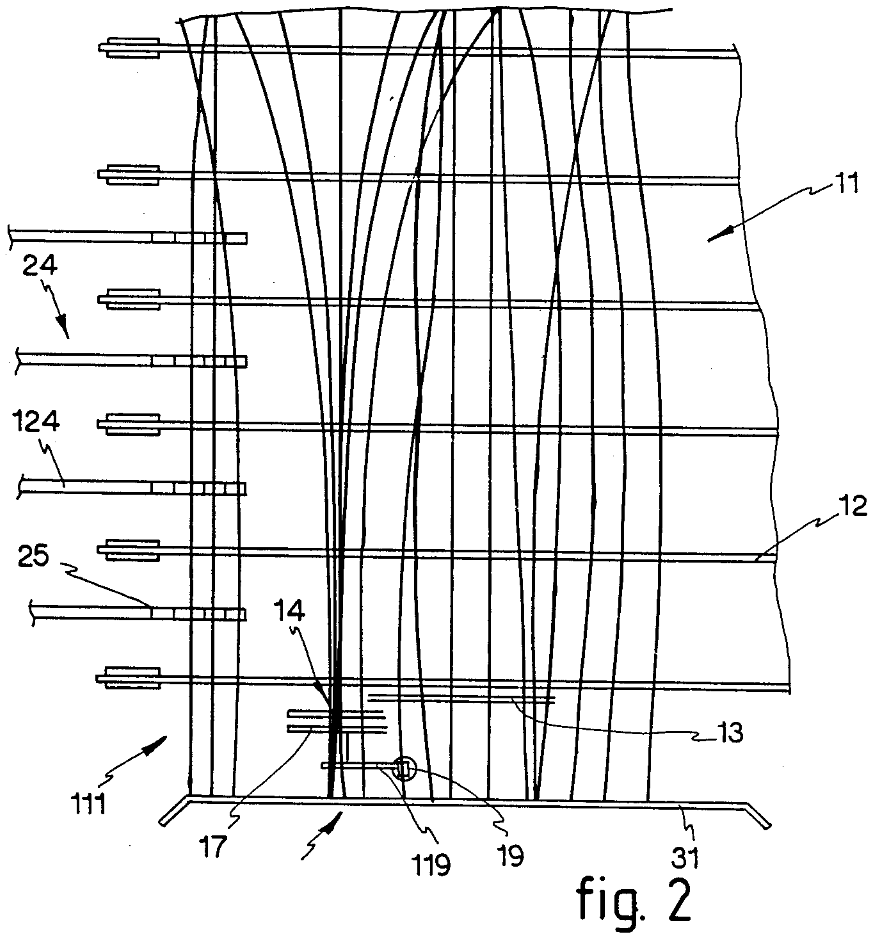

There is described hereinafter, as a non-restrictive example, a preferred embodiment of the invention with the help of the attached figures, in which:

FIG. 1 gives a side view of the device of the invention as applied to a line for conveying bars;

FIG. 2 is a plan view of the line conveying the bars, together with a device according to the invention; and FIGS. 3, 4, 5, 6 and 7 show possible variants of the invention.

In FIG. 1 a device to count bars according to the invention bears the reference 10.

Rolled bars 11, having a circular section in the figure, are carried on a conveyor 12, which is a chain conveyor in this example.

The bars 11 are arranged pell-mell on the conveyor 12 but could even be superimposed on each other or entangled with each other.

An elevator means 13 in this figure carries the bars 11 to a guide funnel 14, which consists in this example of two guide means, or guides, 114 and 214 respectively that approach each other in a downward direction in the manner of a funnel. Such guides 114–214 may consist, for instance, of bars or sections or other suitably curved elements.

The path of the bars 11 as conditioned by the guide funnel 114–214 may be vertical, as shown in the figure, or horizontal or variously inclined to suit specific requirements. For example, their path may be curved, with a vertical inlet and a horizontal or almost horizontal outlet.

The funnel means 14, as is evident in the figure, sets in order the ends of the bars 11, and such ends are positioned one above another in a sequential order. At the lower end of the funnel means 14 withdrawal means 15 withdraw the ends of the bars 11 one at a time and send them once more onto the conveyor 12 at regular intervals. Bars so deposited downstream from the device 10 at regular intervals bear the reference number 111.

During this displacement the bars 11 affect counter means 16.

Figure 7:
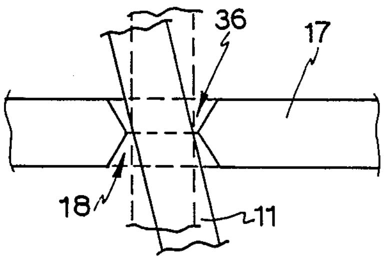

In the example shown the withdrawal means 15 include a wheel 17 provided with a peripheral notch or groove 18 able to engage one bar 11 at a time. This notch 18 can have a tapered or bevelled edge 36 so as to enable inclined bars 11 to be engaged without any disturbance, as can be seen in FIG. 7.

In the position of rest this notch 18 is positioned so as to coincide with the outlet of the guide funnel 14. An actuator means 19, which is a jack in the figure, acts on the wheel 17 through a transmission lever 119 in this case and governs the alternating rotary movement of the wheel 17. This movement is such as to bring the bars 11 engaged in the notch 18 on each occasion forwards in relation to the guide funnel 14 and to place them 11 once more on the conveyor 12.

The bars thus placed and now referenced with 111 are spaced apart and are not superimposed on each other at their ends in question.

While the wheel 17 carries out the movement of the bars 11 from the guide funnel 14 to the conveyor 12, the counter means 16, which in this example comprise a latch 20 with return spring means 21, are actuated. Such latch 20 can be connected to counter means, which are not shown here but can be of various types. Such counter means may comprise electrical or electronic means, for instance, such as a switch and a pulse counter connected to the switch, or else the counter means may comprise mechanical means, such as numbered rollers or other means, and possibly storage means.

Electrical or electronic means are preferable, particularly in the case of high working speeds.

The invention envisages that a required number of bars 111 will be pre-set on pre-selector means, which are not shown here. When this number is reached, the device is halted. To be more exact, in the example shown the actuator means 18 are kept working, but shutter means 22 are actuated which here comprise a rocker lever. This rocker lever is driven by actuator means 23, which also consist of a jack in this case.

These shutter means 22 block the lower end of the funnel means 14 and prevent the bars 11 from falling and therefore from being engaged, one at a time, by the notch 18 made on the periphery of the wheel 17.

According to the invention it is also possible to halt the device 10 completely and thus to halt the actuator means 19 too which drive the wheel 17.

When the required number of numbered bars 111 has been reached, such bars can be discharged by the conveyor 12 with known discharge means. In the example of Fig.2 discharge means 24 include a plurality of chain conveyors 124, which can be equipped possibly with tooth means 25 or other equivalent means able to engage the bars 111. The action of such discharge means 24 may take place with the speed of one conveyor 124 differing from that of the next conveyor 124, so that the bars 111 are drawn away fan-wise and separated progressively.

As an alternative the momentary actuation of the various conveyors 124 can be staggered as necessary from the periphery towards the middle of the bars. In this way the ends of the bars 111 will be separated first from the initial bundle of bars and, when the bars 111 have been spread out fan-wise, the middle part of the bars 111 also will be separated next without any risk of entraining undesired bars 11, heaped up in the central part, with the bars 111.

As an alternative to the embodiment shown, discharge means 24 can be employed which are, for instance, screw-threaded and perhaps have a variable pitch so as to obtain a progressive separation of the bars 111 fan-wise.

FIG. 2 shows also abutment means 31, which in this example consist of a wall parallel to movement of the bars 11; the ends of the bars 11 become butted against such wall 31.

In the example of FIG. 1 the latch 20 acts also as a nonreturn means for the bars 111 and obviates any contacts due, for instance, to the elasticity of the bars 111 themselves, which would tend otherwise to return when withdrawn from the guide funnel.

Figure 3:
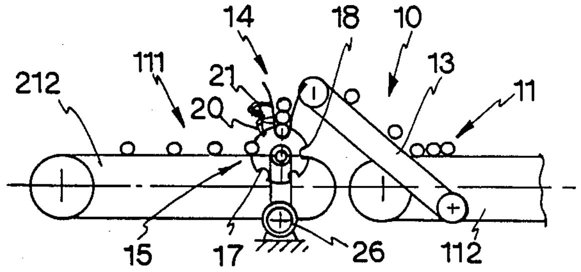

In the variant shown in FIG. 3 the wheel 17 is provided with a plurality of circumferential notches 18. In this variant the motion of the wheel 17 is intermittent but is alway in the same direction. In this way a greater work flow is obtained. This variant is therefore suitable for plants with a very great carrying capacity.

Various systems, all of them known in the state of the art, can be employed to obtain the intermittent motion of the wheel 17. For instance, it is possible to use a motion transmission that employs a Maltese cross or like means.

The figure shows a direct current motor 26 as actuating the wheel 17. The motion of the wheel 17 is intermittent since the high speed of rotation in the event of continuous motion would make it impossible for the bars 11 to fall into the notch 18 when the latter 18 is below the outlet of the guide funnel 14.

It is therefore necessary that the notches 18 should be halted or substantially halted below that outlet for at least a short moment.

Continuous motion could perhaps be employed in the case of a slow work flow.

Figure 4:
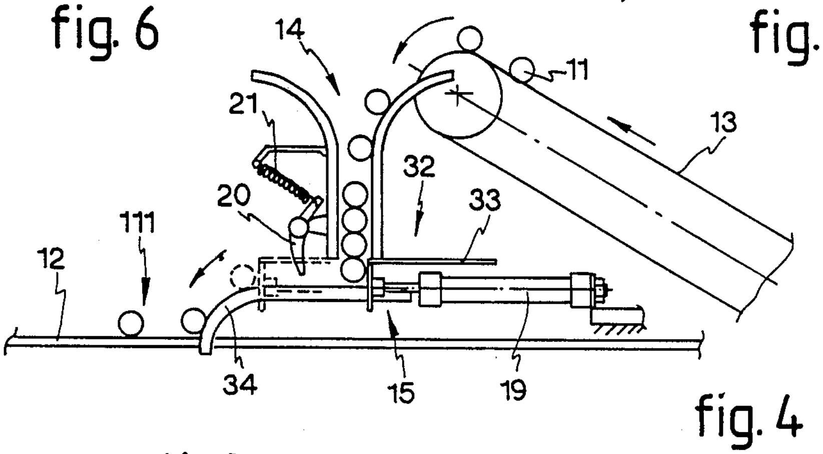

FIG. 4 shows a variant in which the withdrawal means 15 comprise slider means 32 having linear alternating motion and driven by a jack 19 or equivalent means.

This slider means 32 thrusts one bar 11 at a time leaving the sorter 14 along guide means 34, from which the bar 111 then slides down onto the conveyor 12. In this example the slider 32 comprises shutter means 33 consisting here of a horizontal projection.

These shutter means 33 prevent the bars 11 from leaving the guide funnel 14 while the slider 32 is actuated, as can be seen in the figure.

It is possible to use such shutter means 33 instead of the shutter means 22 when the pre-set number of counted bars 11 has been reached.

Figure 5:
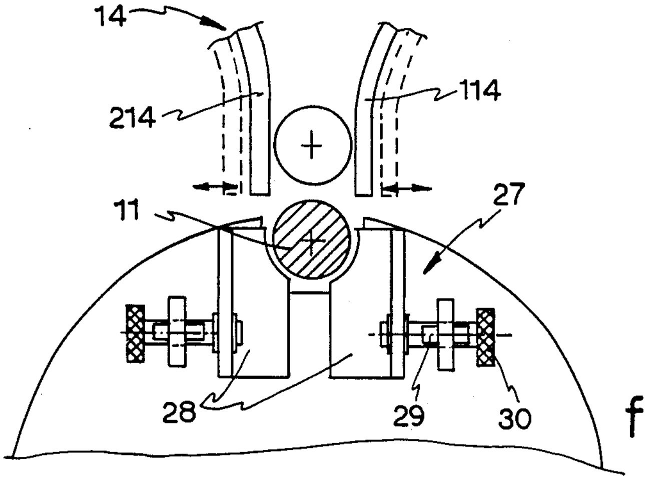

According to a further variant shown in FIG. 5 it is possible to envisage means 27 that adjust the opening of the notch, such means 27 here comprising jaws 28 and adjustment screw means 29 with a knurled knob 30.

In this way, by acting on the screw means 29 it is possible to adjust the mutual opening of the jaws 28 to suit the diameter of the bar 11 leaving the guide funnel 14.

In the example of FIG. 5 the guides 114–214 in their turn of the guide funnel 14 can be adjusted (see the positions marked with lines of dashes in the figure) so as to be adapted to the diameter of the bars 11 to be handled from time to time.

For instance, such adjustment can be obtained by having the guides 114–214 fitted so as to be able to slide, for example, by means of pins cooperating with slots, and so as to be able to be clamped with screw means advantageously equipped with knobs or projections which can be operated by hand without tools.

As an alternative the positions of the guide means 114–214 and jaws 28 can be set with lock screws or bolts.

Another embodiment, which is not shown here, envisages possible automatic adjustment of the guide means 114–214 and jaws 28 by means of actuators known in themselves, the methods for obtaining such regulation being known in the state of the art and being performed mechanically, electromagnetically or by means of a fluid.

Figure 6:
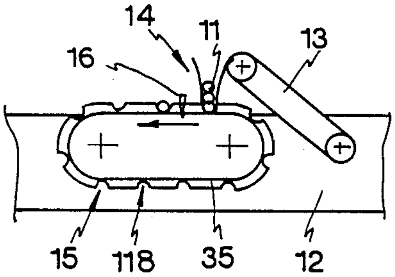

FIG. 6 shows a further possible variant in which the withdrawal means 15 include a chain means 35 with peripheral notches 118. The motion of such chain means 35 can be continuous or intermittent.

We have described her a preferred embodiment of this invention but many variants are possible without departing thereby from the scope of the invention itself.

For instance, it is possible to envisage elevator means 13, guide funnel 14 and withdrawal means 15 of a type different from that shown.

It is possible to visualise counter means 16 different from those shown and equipped, for example, with optical or electrical sensors or sensor of any other type.

According to a further variant it is possible for the discharge means 24 to consist of a section of the conveyor 12 itself rather than being provided separately from the conveyor 12.

In this case the conveyor 12 will consist of two separate sections, one upstream and the other downstream from the device 10, as shown in FIG. 3 for instance, where such sections bear the references 112 and 212 respectively.

In such a case the halting of the device 10 or at least the action of the shutter means 22 can entail the halting of the section 112 upstream from the device 10 so as to obviate a build-up of bars 11.

These and other variants are all possible for a person skilled in this field without departing thereby from the scope of the invention.

I claim:

1. A device for facilitating the counting of bars, comprising:

first conveyor means located at a first, lower level, said bars being randomly disposed thereon;

inclined conveyor means to move only one portion of said bars upward to a second, higher level, the remainder of the bars remaining at the first level;

guide funnel means for receiving said one portion of said bars from said inclined conveyor means at said second level, and capable of arranging said one portion of said bars in an ordered manner wherein the one portion of said bars are placed next to each other in single fashion;

counting means for counting the bars; and withdrawal means for withdrawing said one portion of said bars one by one from said guide funnel means, for causing said one portion of said bars to activate said counting means, and for depositing said bars on a second conveyor means located at said first, lower level.

2. The device as claimed in claim 1, wherein said guide funnel means comprises at least two guide means reciprocally spaced apart but approaching each other in a substantially funnel-like downward direction.

3. The bar counting facilitating device of claim 1, wherein said withdrawal means are capable of continuous motion.

4. The bar counting facilitating device of claim 1, wherein said withdrawal means are capable of reciprocating motion.

5. The device as claimed in claim 1, wherein said withdrawal means are capable of intermittent motion.

6. The device as claimed in claim 1, wherein said withdrawal means include at least one wheel means having at least one peripheral notch to engage said bars.

7. The bar counting facilitating device of claim 1, wherein said withdrawal means comprise as least one chain means with at least one peripheral notch.

8. The bar counting facilitating device of claim 6, further comprising means to adjust the opening of said at least one peripheral notch.

9. The bar counting facilitating device of claim 7, further comprising means to adjust the opening of said at least one peripheral notch.

10. The bar counting facilitating device of claim 6, wherein said peripheral notch has its edge tapered for engagement with inclined bars.

11. The bar counting facilitating device of claim 7, wherein said peripheral notch has its edge tapered for engagement with inclined bars.

12. The bar counting facilitating device of claim 8, wherein said peripheral notch has its edge tapered for engagement with inclined bars.

13. The bar counting facilitating device of claim 1, wherein said withdrawal means comprise at least one slider means.

14. The bar counting facilitating device of claim 1, further comprising shutter means to stop the departure of bars from said guide funnel means.

15. The bar counting facilitating device of claim 14, wherein said shutter means are capable of oscillating.

16. The bar counting facilitating device of claim 14, wherein said shutter means are capable of sliding.

17. The device as claimed in claim 1, wherein said second conveyor means is an extension of said first conveyor means.

* * * * *